(12) United States Patent
Hsu et al.

(10) Patent No.: US 11,541,303 B2
(45) Date of Patent: Jan. 3, 2023

(54) EDUCATIONAL GAMING SYSTEM

(71) Applicant: National Taiwan Normal University, Taipei (TW)

(72) Inventors: Ting-Chia Hsu, Tainan (TW); Yu-Han Tseng, New Taipei (TW); Shih-Chu Chen, New Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 118 days.

(21) Appl. No.: 17/193,415

(22) Filed: Mar. 5, 2021

(65) Prior Publication Data

US 2022/0062751 A1 Mar. 3, 2022

(30) Foreign Application Priority Data

Aug. 26, 2020 (TW) .................................. 109129045

(51) Int. Cl.
  *A63F 9/24* (2006.01)
  *A63F 9/14* (2006.01)
  *G06N 20/00* (2019.01)
  *A63F 3/00* (2006.01)

(52) U.S. Cl.
  CPC ................ *A63F 9/24* (2013.01); *A63F 9/143* (2013.01); *G06N 20/00* (2019.01); *A63F 2003/00359* (2013.01); *A63F 2009/2425* (2013.01); *A63F 2009/2485* (2013.01); *A63F 2250/50* (2013.01)

(58) Field of Classification Search
  CPC .. A63F 9/24; A63F 9/143; A63F 2003/00359; A63F 2009/2425; A63F 2009/2485; A63F 2250/50; G06N 20/00
  See application file for complete search history.

(56) References Cited

U.S. PATENT DOCUMENTS

2018/0307045 A1* 10/2018 Nishi ................... G02B 27/017

FOREIGN PATENT DOCUMENTS

TW 201932172 A * 8/2019 ............. A63H 33/04

* cited by examiner

*Primary Examiner* — Werner G Garner
(74) *Attorney, Agent, or Firm* — Birch, Stewart, Kolasch & Birch, LLP

(57) ABSTRACT

An educational gaming system includes control cards, road pieces and a robotic device. Each of the control cards has a graphic corresponding to an instruction. The road pieces are arranged to form a road on which the robotic device is configured to move. The robotic device is communicable with an electronic device that executes an application program. The electronic device captures an image of the graphic of the control card, conducts a machine learning algorithm based on the image to obtain the instruction, and transmits the instruction to the robotic device. The robotic device obtains a road-piece signal value that is generated by scanning one of the road pieces, and performs movement based on the instruction and the road-piece signal value.

8 Claims, 9 Drawing Sheets

EDUCATIONAL GAMING SYSTEM

CROSS-REFERENCE TO RELATED APPLICATION

This application claims priority of Taiwanese Invention Patent Application No. 109129045, filed on Aug. 26, 2020.

FIELD

The disclosure relates to an educational gaming system, and more particularly to an educational gaming system that has extendable ways of game play using machine learning.

BACKGROUND

A conventional board game is often deficient in extension mechanisms of game play, and thus ways of playing the conventional board game cannot be enriched.

SUMMARY

Therefore, an object of the disclosure is to provide an educational gaming system that can alleviate at least one of the drawbacks of the prior art.

According to the disclosure, the educational gaming system is adapted to be used with an electronic device. The electronic device includes an image capturing unit. The educational gaming system includes a plurality of control cards, a plurality of road pieces and a mobile robotic device.

Each of the control cards has a control-card graphic corresponding to a control-card instruction.

The road pieces are to be arranged to form a road, and each of the road pieces is shaped as a square and has a piece background and a foreground pattern. The piece background is colored with one color selected from among a light color and a dark color, and the foreground pattern is colored with the other one color among the light color and the dark color.

The mobile robotic device is configured to move on the road formed by the road pieces. The mobile robotic device includes a communication unit, a driving unit, a sensing unit, and a processing unit that is electrically connected to the communication unit, the driving unit and the sensing unit.

The communication unit of the mobile robotic device is communicable with the electronic device that executes an application program (APP) customized for the educational gaming system. An image of the control-card graphic of one of the control cards is to be captured by the image capturing unit to enable the electronic device to conduct, by utilizing a supervised learning model contained in the APP with the image of the control-card graphic serving as input, a machine learning algorithm so as to obtain the control-card instruction corresponding to the control-card graphic, and to transmit the control-card instruction thus obtained to the communication unit of the mobile robotic device.

The processing unit of the mobile robotic device is configured to obtain at least one road-piece signal value that is generated by the sensing unit by scanning one of the road pieces, and to control, based on the control-card instruction and the at least one road-piece signal value, the driving unit to drive movement of the mobile robotic device.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
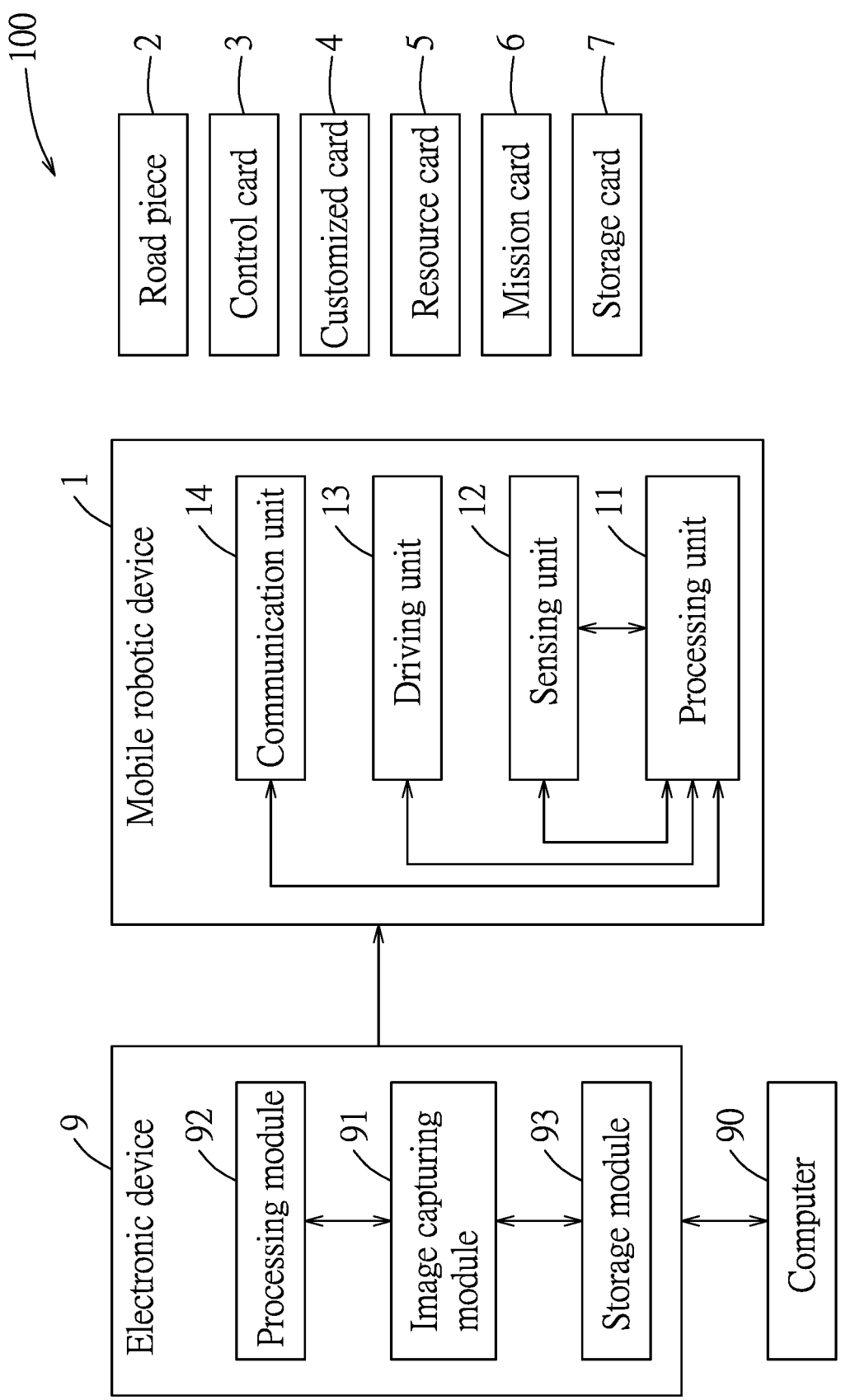
FIG. 1 is a block diagram illustrating an embodiment of an educational gaming system according to the disclosure.

Referring to FIG. 1, an embodiment of an educational gaming system 100 according to the disclosure is illustrated. The educational gaming system 100 is adapted to be used with an electronic device 9 and a computer 90.

The computer 90 is communicable with the electronic device 9. The computer 90 includes an image capturing instrument (not shown). In this embodiment, the computer 90 may be implemented to be a desktop computer, a laptop computer, a notebook computer or a tablet computer, but implementation thereof is not limited to what are disclosed herein and may vary in other embodiments. In one embodiment, the computer 90 is electrically connected to an external image capturing instrument, and remotely controls the external image capturing instrument.

The electronic device 9 may be implemented by a smartphone, a tablet computer, a personal digital assistant (PDA) or any portable/mobile device, but implementation thereof is not limited to what are disclosed herein and may vary in other embodiments. The electronic device 9 includes a processing module 91, an image capturing module 92 and a storage module 93. The processing module 91 is electrically connected to the image capturing module 92 and the storage module 93. The electronic device 9 downloads, e.g., from the Internet, an application program (APP) customized for the educational gaming system 100. Further, the APP is installed on the electronic device 9 and is stored in the storage module 93.

In this embodiment, the processing module 91 may be implemented by a central processing unit (CPU), a microprocessor, a micro control unit (MCU), a system on a chip (SoC), or any circuit configurable/programmable in a software manner and/or hardware manner to confer functionalities discussed in this disclosure.

In this embodiment, the image capturing module 92 is implemented by, but is not limited to, a camera.

In this embodiment, the storage module 93 may be implemented by, but is not limited to, flash memory, a hard disk drive (HDD), a solid state disk (SSD), electricallyerasable programmable read-only memory (EEPROM) or any other non-volatile memory devices.

The educational gaming system 100 includes a mobile robotic device 1, a plurality of road pieces 2, a plurality of control cards 3, a plurality of customized cards 4, a plurality of resource cards 5, a plurality of mission cards 6 and a plurality of storage cards 7.

Each of the resource cards 5 represents a specific amount of a kind of resources (e.g., one unit of iron, two units of iron ore or three units of wood).

Each of the mission cards 6 provides a specific mission description.

Each of the storage cards 7 represents a space for storing a requested amount of resources.

Figure 5:
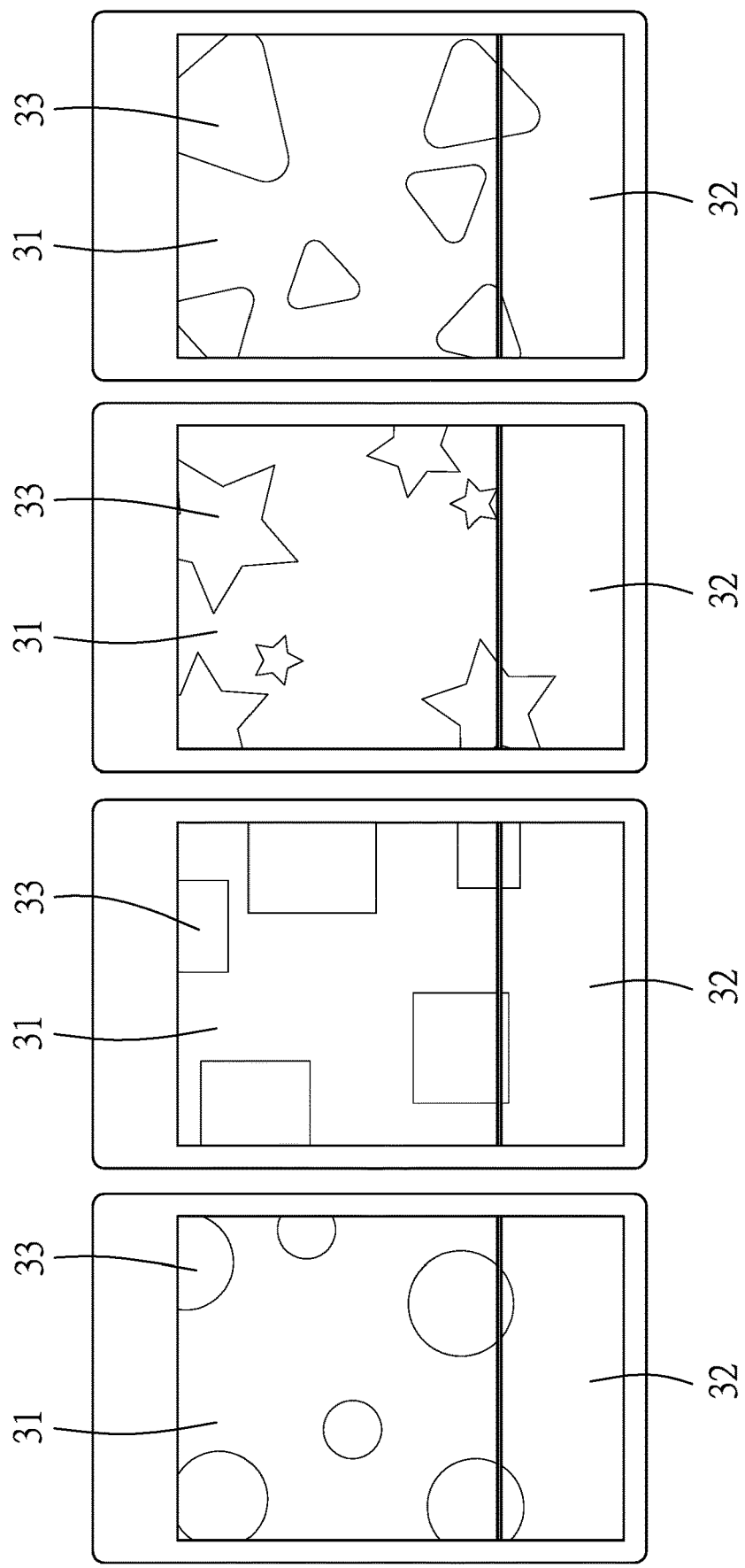
FIG. 5 is a schematic diagram illustrating an embodiment of control cards of the educational gaming system according to the disclosure.

Referring to FIG. 5, each of the control cards 3 has a control-card background pattern 33, and includes a control-card description (not shown), and a control-card graphic (not shown) corresponding to a control-card instruction. The control-card graphic is printed on a graphic region 31 of the control card 3, and the control-card description is printed on a description region 32 of the control card 3 and corresponds to the control-card graphic. The control-card background patterns 33 respectively of the control cards 3, are different from one another. For example, the control-card background patterns 33 of the control cards 3 shown from left to right in FIG. 5 are respectively circles, rectangles, star-shaped and triangles. It is worth to note that differences in edges, colors and shape of the control-card background patterns 33 promote classification of these features by using image recognition techniques. It should be noted that in other embodiments, the control-card background patterns 33 of the control cards 3 may be identical.

In one embodiment, for the control-card instructions "one step forward", "one-quarter turn in a counterclockwise direction" and "one-quarter turn in a clockwise direction", the control-card graphics respectively corresponding thereto are an upwards arrow, an upwards arrow with tip leftwards, and an upwards arrow with tip rightwards, and the control-card descriptions respectively corresponding to the control-card graphics are "One step forward", "One-quarter turn left" and "One-quarter turn right".

Figure 7:
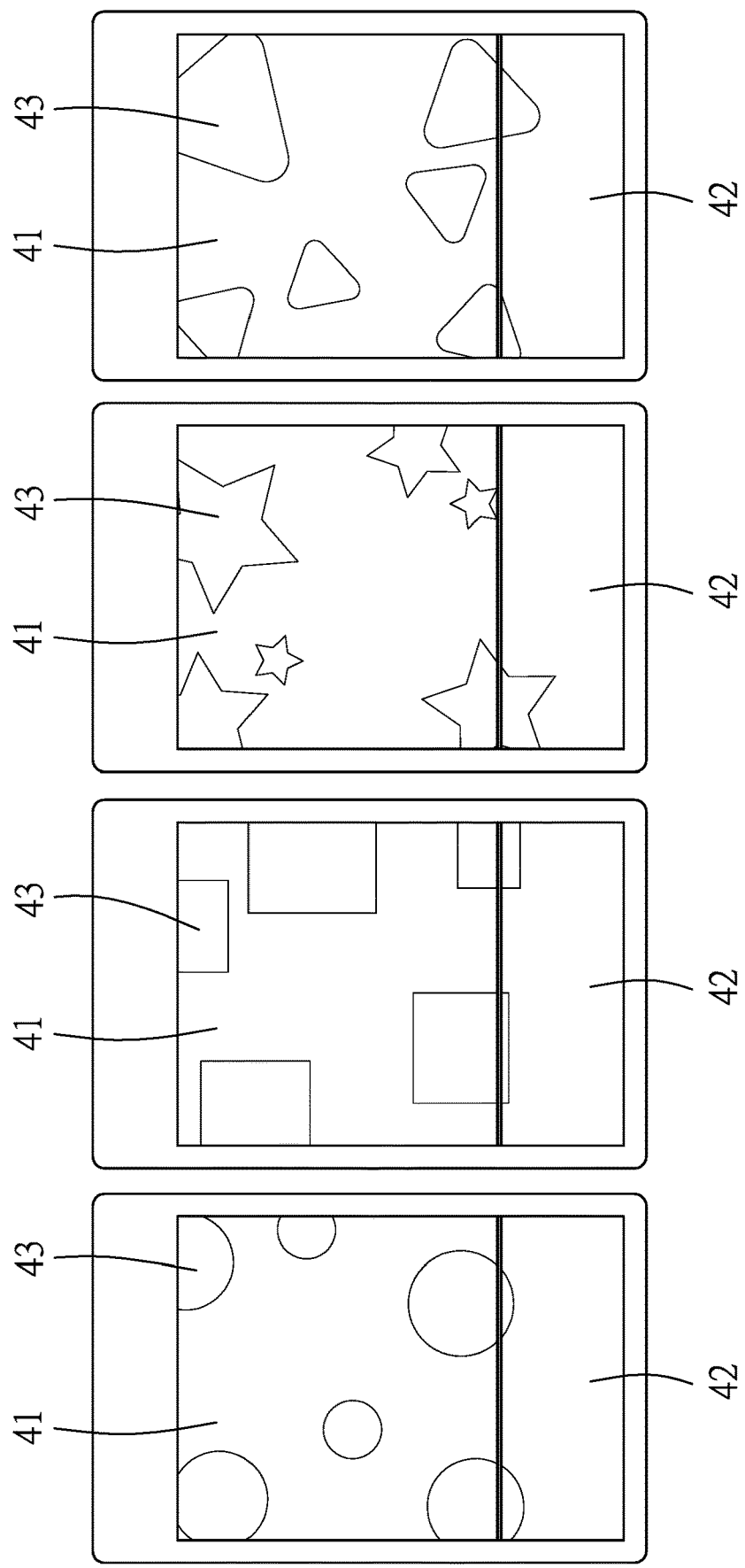
FIG. 7 is a schematic diagram illustrating an embodiment of customized cards of the educational gaming system according to the disclosure.

Similarly, referring to FIG. 7, each of the customized cards 4 has a customized-card background pattern 43, and includes a customized-card description (not shown), and a customized-card graphic (not shown) corresponding to a customized-card instruction. It is worth to note that the customized-card description, the customized-card graphic and the customized-card instruction are customizable by a user. The customized-card graphic may be printed or drawn by hand on a graphic region 41 of the customized card 4, and the customized-card description may be printed or written by hand on a description region 42 of the customized card 4. The customized-card background patterns 43 respectively of the customized cards 4, are different from one another. For example, the customized-card background patterns 43 of the customized cards 4 shown from left to right in FIG. 7 are respectively circles, rectangles, star-shaped and triangles. It is worth to note that differences in edges, colors and shape of the customized-card background patterns 43 promote classification of these features by using image recognition techniques. It should be noted that in other embodiments, the customized-card background patterns 43 of the customized cards 4 may be identical.

In one embodiment, for the customized-card instructions "one step forward", "two steps forward" and "one-quarter turn in a counterclockwise direction", the customized-card graphics respectively corresponding thereto are an upwards arrow, double upwards arrows, and an upwards arrow with tip leftwards, and the customized-card description respectively corresponding to the customized-card graphics are "One step forward", "Two steps forward" and "One-quarter turn left".

In one embodiment, the customized cards 4 may serve as substitutes for the control cards 3 during game play using the educational gaming system 100.

Figure 4:
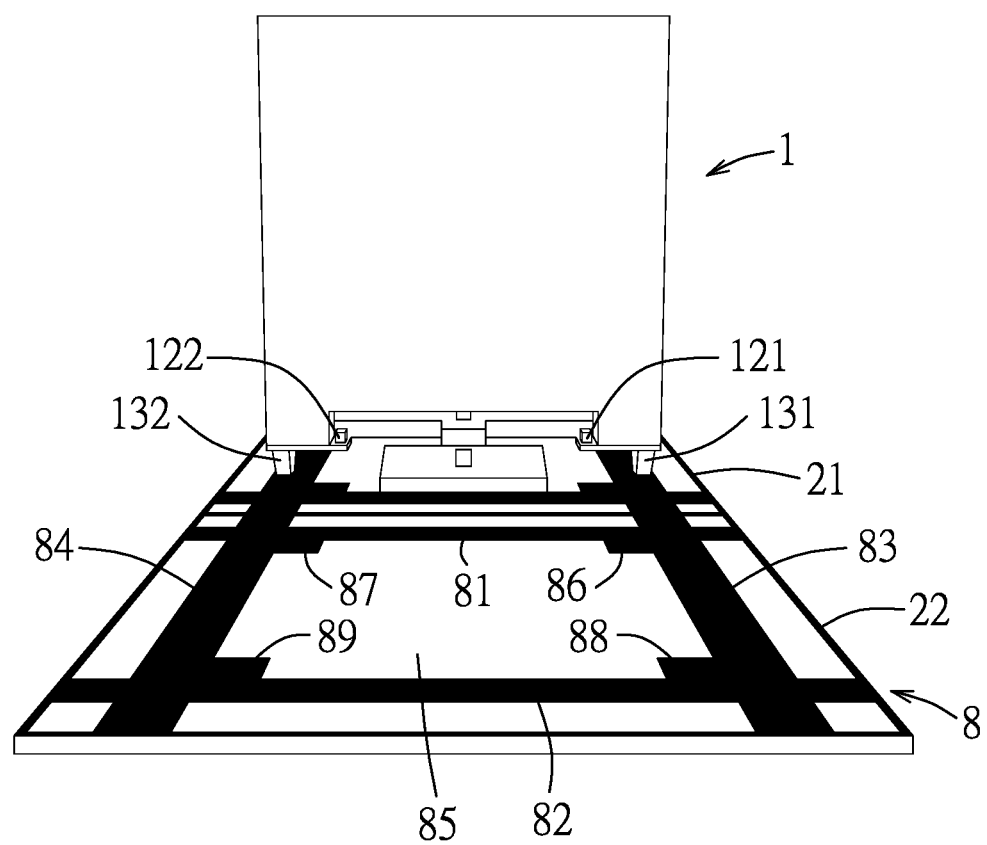
FIG. 4 is a perspective view illustrating an embodiment of an arrangement of the educational gaming system for performing a calibration procedure.
Figure 6:
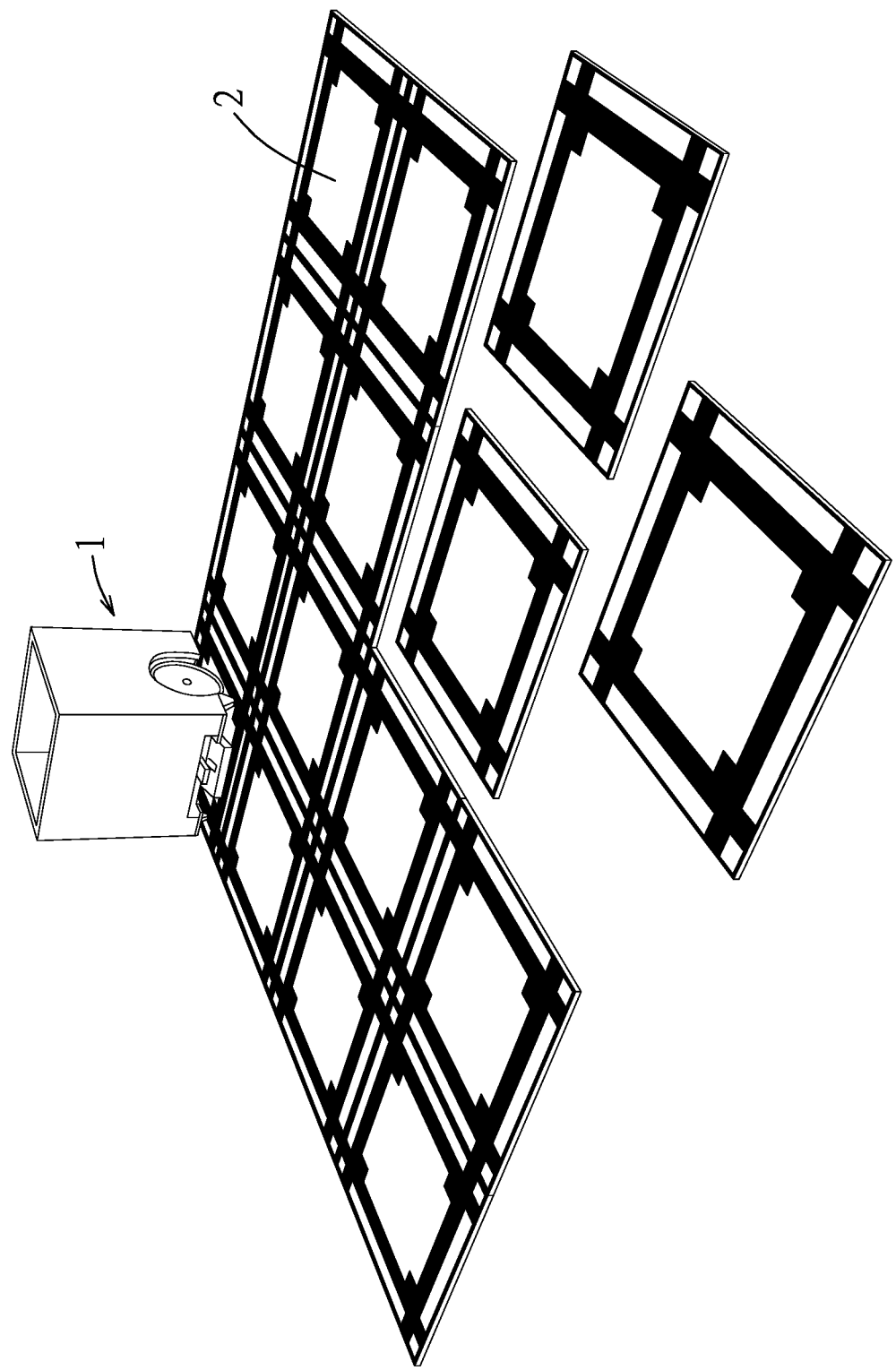
FIG. 6 is a perspective view illustrating an embodiment of an arrangement of the educational gaming system for playing a board game.

Referring to FIGS. 4 and 6, the road pieces 2 are to be arranged to form a road. Each of the road pieces 2 is shaped as a square and has a piece background and a foreground pattern. The piece background is colored with one color selected from among a light color (e.g., a white color) and a dark color (a black color), and the foreground pattern is colored with the other one color among the light color and the dark color. It should be noted that in this embodiment, a grayscale value of each color ranges between 0 and 255, and the dark color has a grayscale value that is greater than that of the light color. In this embodiment, the piece background is colored with the light color (e.g., a pink color having a grayscale value that is equal to 159, a light blue color having a grayscale value that is equal to 90, a light green color having a grayscale value that is equal to 68, or a white color having a grayscale value that is equal to 0), and the foreground pattern is colored with the dark color (e.g., a black color having a grayscale value that is equal to 255). However, in other embodiments where the grayscale value of the black color is set as 0 and the grayscale value of the white color is set as 255, the dark color may have a grayscale value that is smaller than that of the light color. The foreground pattern includes four stripes 81, 82, 83 and that resemble two pairs of rails and that are respectively parallel to four sides of the road piece 2. The foreground pattern further contains four square blocks 86, 87, 88 and 89 that are respectively located at four inner corners defined by intersections of the four stripes 81, 82, 83 and 84.

The mobile robotic device 1 is configured to move on the road formed by the road pieces 2. Referring to FIG. 1, the mobile robotic device 1 includes a communication unit 14, a driving unit 13, a sensing unit 12, and a processing unit 11 that is electrically connected to the communication unit 14, the driving unit 13 and the sensing unit 12.

In this embodiment, the communication unit 14 is implemented to be a network interface controller or a wireless transceiver that supports wired communication standards and/or wireless communication standards, such as Bluetooth technology standards or cellular network technology standards, but is not limited thereto. The communication unit 14 of the mobile robotic device 1 is communicable with the electronic device 9, which executes the APP customized for the educational gaming system 100, using Bluetooth techniques.

The processing unit 11 of the mobile robotic device is configured to receive instructions via the communication unit 14 that is communicable with the electronic device 9. In this embodiment, the processing unit 11 may be implemented by a central processing unit (CPU), a microprocessor, a micro control unit (MCU), a system on a chip (SoC), or any circuit configurable/programmable in a software manner and/or hardware manner to confer functionalities discussed in this disclosure.

Figure 3:
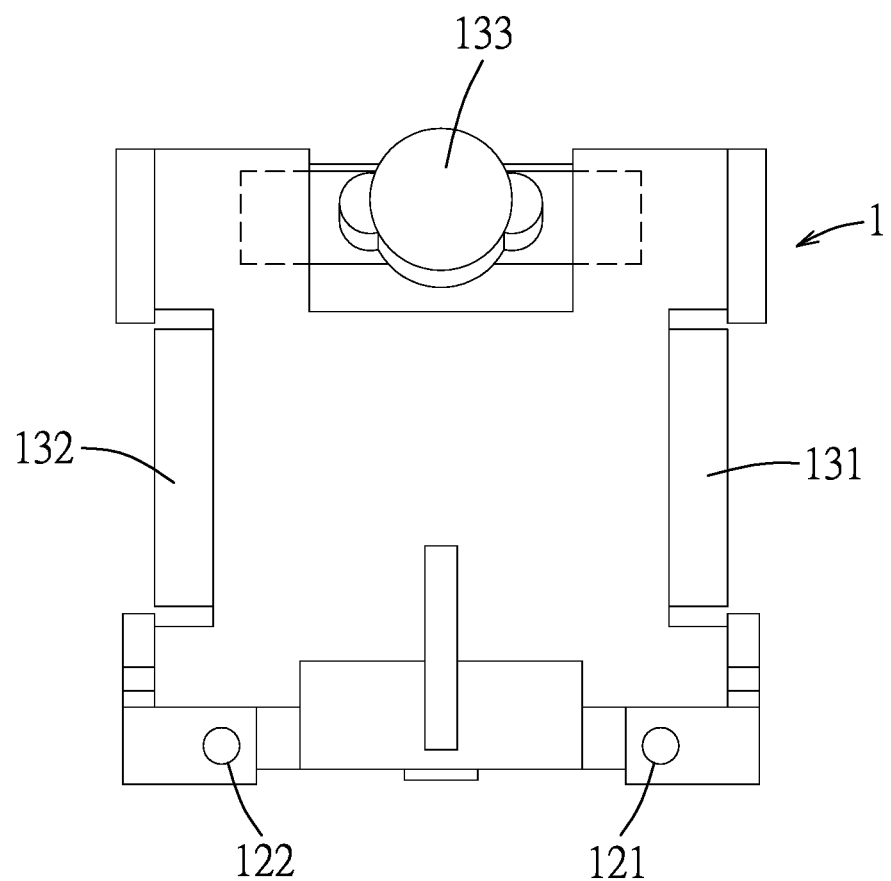
FIG. 3 is a bottom view illustrating the embodiment of the mobile robotic device according to the disclosure.

In this embodiment, the driving unit 13 includes a motor (not shown) and three wheels 131, 132, 133 as shown in FIGS. 3 and 4. In particular, the wheel 133 is implemented by a universal wheel. The motor is configured to be controlled by the processing unit 11 to drive movement of the wheels 131 and 132, such that the mobile robotic device 1 is driven to move straight or to turn.

Figure 2:
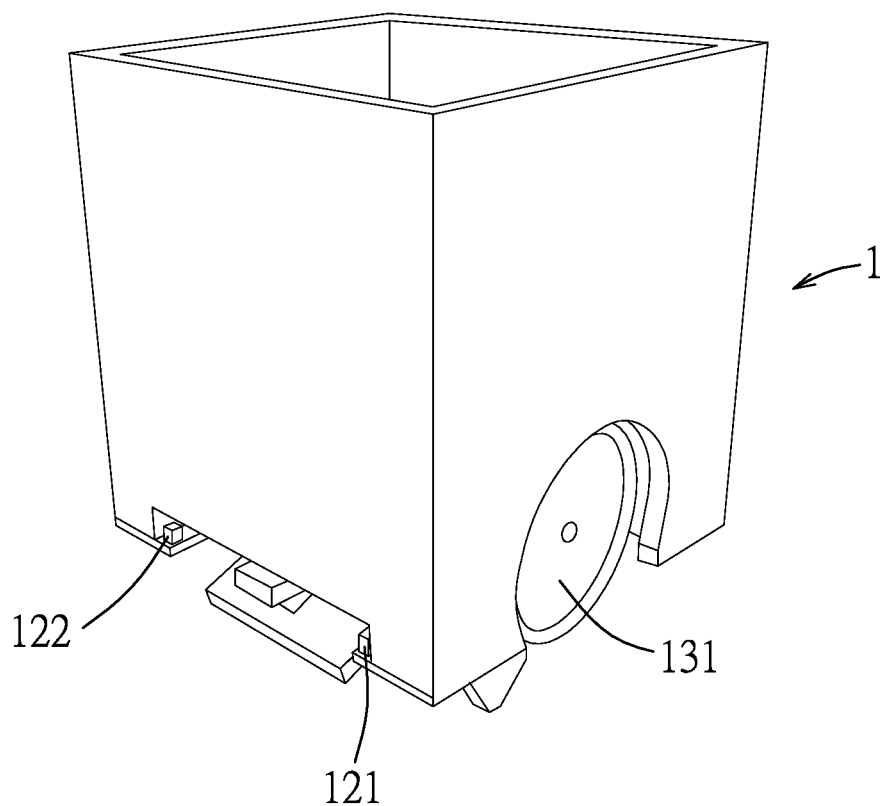
FIG. 2 is a perspective view illustrating an embodiment of a mobile robotic device of the educational gaming system according to the disclosure.

Referring to FIGS. 2 to 4, the sensing unit 12 of the mobile robotic device 1 includes two infrared sensors 121 and 122 that are mounted on a bottom side of the mobile robot device 1 and that are configured to respectively align with two of the four square blocks 86, 87, 88 and 89 when the mobile robotic device 1 is disposed on the road piece 2. Specifically speaking, the sensing unit 12 further includes two infrared emitters (not shown) which respectively correspond to the infrared sensors 121 and 122 and each of which is configured to emit an infrared signal toward the road piece 2 under the mobile robot device 1. Each of the infrared sensors 121 and 122 is configured to receive a reflection of the infrared signal emitted by the corresponding one of the infrared emitters and thereby generate a road-piece signal value.

The electronic device 9 is configured to capture, by utilizing the image capturing module 92, an image of the control-card graphic of one of the control cards 3, and to conduct, by utilizing a supervised learning model contained in the APP with the image of the control-card graphic serving as input, a machine learning algorithm so as to obtain the control-card instruction corresponding to the control-card graphic. It should be noted that the supervised learning model has to be trained in advance prior to conducting the machine learning algorithm so as to obtain the control-card instruction. In some embodiments, the supervised learning model is related to classification and is utilized to categorize the control-card graphics into classes, i.e., the control-card instructions to which the control-card graphics respectively correspond. In some embodiments, the supervised learning model is implemented by a convolutional neural network (CNN) model combined with techniques of transfer learning, wherein the CNN model allows a user to set hyperparameters thereof.

It is worth to note that during the process of capturing the image of the control-card graphic of one of the control cards 3, the control-card background pattern 33 of the one of the control cards may also be included in the image of the control-card graphic. Distinctions present among the control-card background patterns 33 of the control cards 3 provide additional features to the images of the control-card graphics of the control cards 3, thereby promoting correctness of the control-card instructions related to the control cards 3 obtained from the supervised learning model that is utilized by the electronic device 9 to conduct the machine learning algorithm.

Thereafter, the electronic device 9 is configured to transmit the control-card instruction thus obtained to the communication unit 14 of the mobile robotic device 1.

The processing unit 11 of the mobile robotic device 1 is configured to obtain at least one road-piece signal value that is generated by the sensing unit 12 by scanning one of the road pieces 2 (e.g., the road-piece signal generated by each of the infrared sensors 121 and 122), and to control, based on the control-card instruction and the at least one road-piece signal value, the driving unit 13 to drive movement of the mobile robotic device 1.

In order to realize customization of each of the customized cards 4, images of the customized-card graphics of the customized cards 4 have to be captured by the image capturing instrument of the computer 90, and the customized-card instructions respectively corresponding to the customized-card graphics have to be inputted to the computer 90. In one embodiment, the customized-card instructions may be inputted by selecting preset option (s) in a menu of a user interface provided by the computer 90. Next, the computer 90 is configured to train a copy of the supervised learning model based on the images of the customized-card graphics and the customized-card instructions, and to update, with the copy of the supervised learning model thus trained, the supervised learning model contained in the APP executed by the electronic device 9.

In one embodiment, when the computer 90 trains the copy of the supervised learning model, at least one of parameters of the copy of the supervised learning model is adjustable based on user input. For example, the computer 90 may provide a webpage-like platform for receiving user input, and the computer 90 adjusts the at least one of parameters of the copy of the supervised learning model based on the user input thus received.

The electronic device 9 is further configured to capture, by utilizing the image capturing module 92, the image of the customized-card graphic of one of the customized cards 4, and to conduct, by utilizing the supervised learning model which has been updated with the image of the customized-card graphic serving as input, the machine learning algorithm so as to obtain the customized-card instruction corresponding to the customized-card graphic.

Then, the electronic device 9 is configured to transmit the customized-card instruction thus obtained to the communication unit 14 of the mobile robotic device 1. The processing unit 11 of the mobile robotic device is further configured to control, based on the customized-card instruction and the at least one road-piece signal value, the driving unit 13 to drive movement of the mobile robotic device 1.

When the educational gaming system 100 is used for the first time or whenever the educational gaming system 100 needs to be calibrated, a calibration procedure contained in the APP is executed by the processing module 91 of the electronic device 9. At the same time, as shown in FIG. 4, the mobile robotic device 1 has to be placed on a calibration piece 8 defined by adjoining two road pieces selected from among the road pieces 2 (hereinafter also referred to as calibration sub-pieces 21 and 22), where the two infrared sensors 121 and 122 respectively align with two of the four square blocks 86, 87, 88 and 89. The calibration procedure includes a sensor-calibration sub-procedure, a translation-calibration sub-procedure and a rotation-calibration sub-procedure.

Specifically speaking, in the sensor-calibration sub-procedure, the mobile robotic device 1 moving on one of the road pieces 2 defining the calibration piece 8 is configured to obtain two sets of road-piece signal values respectively generated by the two infrared sensors 121 and 122 by scanning the foreground pattern, and to determine two minimum values that are respectively among the two sets of road-piece signal values and that serve as two minimum dark-color values. Similarly, the mobile robotic device 1 is configured to obtain another two sets of road-piece signal values respectively generated by the two infrared sensors 121 and 122 by scanning the piece background, and to determine two maximum values that are respectively among the another two sets of road-piece signal values and that serve as two maximum light-color values. In this embodiment, the road-piece signal values generated by the two infrared sensors 121 and 122 by scanning patterns with the dark color are greater than those obtained by scanning backgrounds with the light color. Accordingly, the two minimum dark-color values are both greater than the two maximum light-color values. In this way, for one of the infrared sensors 121 and 122, when it is determined that the road-piece signal value generated by scanning one of the road pieces 2 is greater than the minimum dark-color value, the mobile robotic device 1 determines that the dark color is detected. On the other hand, when it is determined that the road-piece signal value generated by scanning the one of the road pieces 2 is smaller than the maximum light-color value, the mobile robotic device 1 determines that the light color is detected.

In other embodiments, the road-piece signal values generated by the two infrared sensors 121 and 122 by scanning patterns with the dark color are smaller than those obtained by scanning backgrounds with the light color. Accordingly, two maximum dark-color values, which are two maximum values among the two sets of road-piece signal values obtained by scanning the foreground pattern, are both smaller than two minimum light-color values, which are two minimum values among the another two sets of road-piece signal values obtained by scanning the piece background.

In the translation-calibration sub-procedure, the mobile robotic device 1 disposed on one of the road pieces 2 defining the calibration piece 8 (e.g., the calibration sub-piece 21 as shown in FIG. 4) is further configured to move straight from the one of the road pieces 2 to the other one of the road pieces 2 (e.g., the calibration sub-piece 22). The mobile robotic device 1 is configured to determine a translation duration based on the minimum dark-color values, the maximum light-color values, and the road-piece signal values obtained from the two infrared sensors 121 and 122 when the mobile robotic device 1 moves, and to store information of the translation duration. It is worth to note that in this embodiment, the translation duration corresponds to a translation time span between two consecutive edge detection events, in each of which a transition from the light color to the dark color is detected via the two infrared sensors 121 and 122, i.e., it is determined that the light color is detected first and immediately followed by detection of the dark color. For example, in a scenario where the mobile robotic device 1 is moving straight from a rear end to a front end of the calibration piece 8 relative to the viewer as shown in FIG. 4, the translation duration corresponds to a translation time span between a first edge detection event where the transition from the light color to the dark color is detected via the two infrared sensors 121 and 122 (i.e., a rear edge of the stripe 81 on the calibration sub-piece 22 is detected) and a second edge detection event where the transition from the light color to the dark color is once again detected via the two infrared sensors 121 and 122 (i.e., rear edges of the square blocks 88, 89 on the calibration sub-piece 22 are detected). It is noted that the rear edges herein refer to edges of the stripes 81, 82, 83, 84 or the square blocks 86,87, 88, 89 that are farther away from the viewer (see FIG. 4) than edges of the stripes 81, 82, 83, 84 or the square blocks 86,87, 88, 89 that are nearer to the viewer.

In the rotation-calibration sub-procedure, the mobile robotic device 1 disposed on one of the road pieces 2 defining the calibration piece 8 is further configured to rotate by a quarter turn in a clockwise direction or a counterclockwise direction. The mobile robotic device 1 is configured to determine a rotation duration based on the minimum dark-color values, the maximum light-color values, and the road-piece signal values obtained from the two infrared sensors 121 and 122 when the mobile robotic device 1 rotates, and to store information of the rotation duration. It is worth to note that in this embodiment, the rotation duration corresponds to a rotation time span between two consecutive block detection events, in each of which a pair of the square blocks 86, 87, 88, 89 are detected via the two infrared sensors 121 and 122. For example, in a scenario where the mobile robotic device 1 is rotating in a clockwise direction on the calibration sub-piece 22 as shown in FIG. 4, the rotation duration corresponds to a rotation time span between a first block detection event where a pair of the square blocks 88, 89 are detected and a second block detection event where another pair of the square blocks 87, 89 are detected.

In one embodiment, the processing unit 11 of the mobile robotic device 1 is configured to, when receiving the control-card instruction (or the customized-card instruction) that orders the mobile robotic device 1 to move from a current one of the road pieces 2 forming the road to a next one of the road pieces 2 adjoining the current one of the road pieces 2, control the driving unit 13 so as to drive the mobile robotic device 1 to move from the current one of the road pieces 2 to the next one of the road pieces 2.

Figure 8:
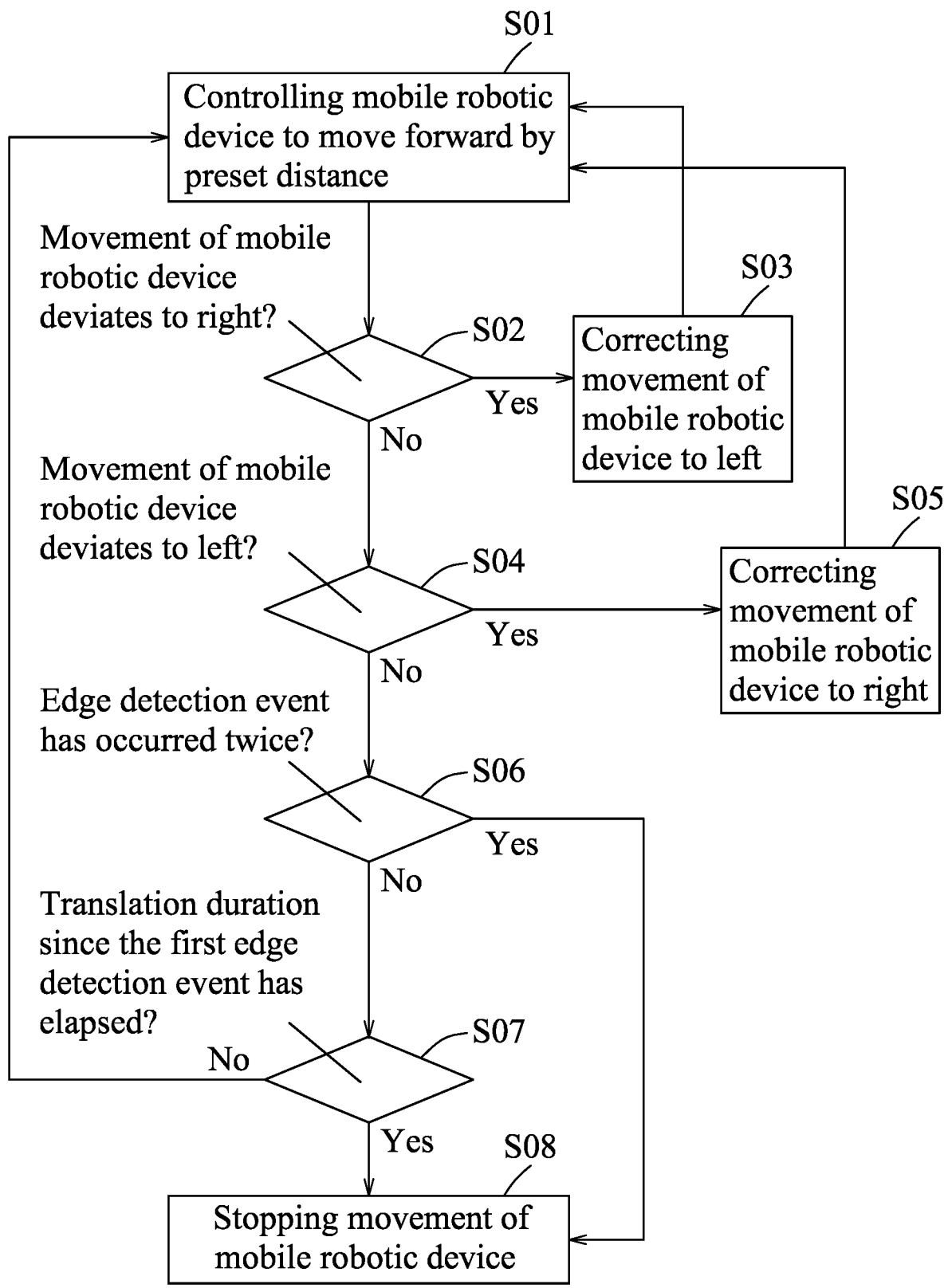
FIG. 8 is a flow chart illustrating an embodiment of an advancing adjustment procedure for controlling the mobile robotic device so as to move in a straight line.

Specifically, the processing unit 11 is configured to adjust, based on the road-piece signal values respectively generated by the two infrared sensors 121 and 122 during movement of the mobile robotic device 1, control of the driving unit 13 such that the mobile robotic device 1 moves in a straight line. Referring to FIG. 8, an advancing adjustment procedure for controlling the mobile robotic device 1 so as to move in a straight line includes steps S01 to S08 delineated below.

In step S01, the processing unit 11 controls the mobile robotic device 1 so as to move forward by a preset distance (e.g., one centimeter).

In step S02, the processing unit 11 determines whether movement of the mobile robotic device 1 deviates to the right direction based on detection of the piece background and/or the foreground pattern of the road pieces 2 by the infrared sensors 121 and 122. When it is determined that the movement of the mobile robotic device 1 deviates to the right direction, a flow of the advancing adjustment procedure proceeds to step S03, otherwise, the flow proceeds to step S04.

In step S03, the processing unit 11 corrects the movement of the mobile robotic device 1 to the left direction. Then, the flow returns to step S01.

In step S04, the processing unit 11 determines whether the movement of the mobile robotic device 1 deviates to the left direction based on detection of the piece background and/or the foreground pattern of the road pieces 2 by the infrared sensors 121 and 122. When it is determined that the movement of the mobile robotic device 1 deviates to the left direction, the flow of the advancing adjustment procedure proceeds to step S05, otherwise, the flow proceeds to step S06.

In step S05, the processing unit 11 corrects the movement of the mobile robotic device 1 to the right direction. Then, the flow returns to step S01.

In step S06, the processing unit 11 determines whether the edge detection event has occurred twice since the mobile robotic device 1 started to be driven to move from the current one of the road pieces 2 to the next one of the road pieces 2. When it is determined that the edge detection event has occurred twice during such movement of the mobile robotic device 1, the flow of the advancing adjustment procedure proceeds to step S08, otherwise, the flow proceeds to step S07.

In step S07, the processing unit 11 determines whether the translation duration has elapsed since the first edge detection event. When it is determined that the translation duration since occurrence of the first edge detection event during such movement of the mobile robotic device 1 has elapsed, the flow of the advancing adjustment procedure proceeds to step S08, otherwise, the flow returns to step S01.

In step S08, the processing unit 11 stops the movement of the mobile robotic device 1.

Figure 9:
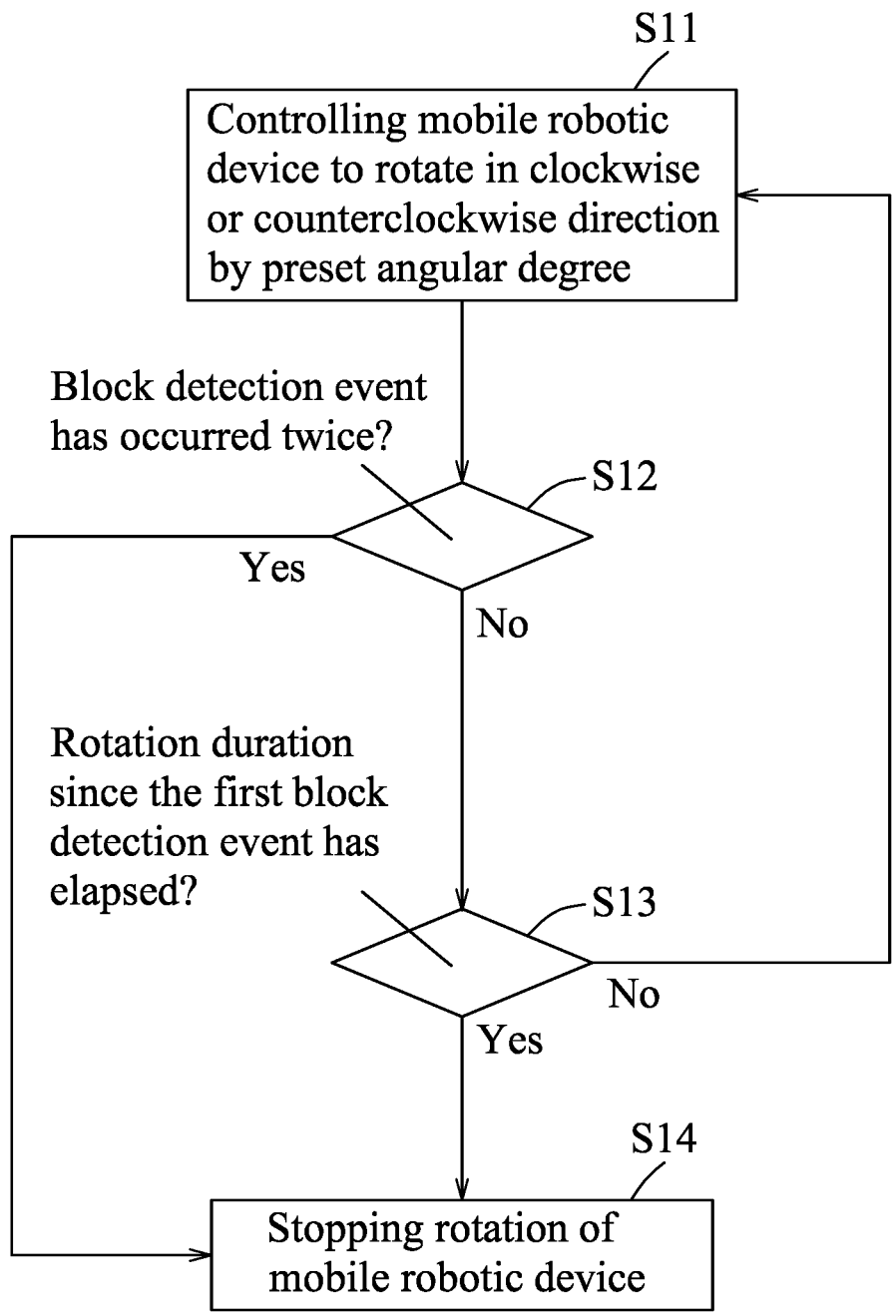
FIG. 9 is a flow chart illustrating an embodiment of a turning adjustment procedure for controlling the mobile robotic device so as to rotate by a quarter turn in a clockwise direction or a counterclockwise direction.

On the other hand, the processing unit 11 of the mobile robotic device 1 is configured to, when receiving the control-card instruction (or the customized-card instruction) that orders the mobile robotic device 1 to rotate by a quarter turn in one of a clockwise direction and a counterclockwise direction, control the driving unit 13 so as to drive the mobile robotic device 1 to rotate by a quarter turn in the one of a clockwise direction and a counterclockwise direction. Referring to FIG. 9, a turning adjustment procedure for driving the mobile robotic device 1 so as to rotate by a quarter turn in a clockwise direction or a counterclockwise direction includes steps S11 to S14 delineated below.

In step S11, the processing unit 11 controls the mobile robotic device 1 so as to rotate in the clockwise or counterclockwise direction by a preset angular degree (e.g., one degree).

In step S12, the processing unit 11 determines whether the block detection event has occurred twice since the mobile robotic device 1 started to be driven to rotate by a quarter turn in the one of a clockwise direction and a counterclockwise direction. When it is determined that the block detection event has occurred twice during such rotation of the mobile robotic device 1, the flow of the turning adjustment procedure proceeds to step S14, otherwise, the flow proceeds to step S13.

In step S13, the processing unit determines whether the rotation duration since the first block detection event has elapsed. When it is determined that the rotation duration since the beginning of such rotation of the mobile robotic device 1 has elapsed, the flow of the turning adjustment procedure proceeds to step S14, otherwise, the flow returns to step S11.

In step S14, the processing unit 11 stops the rotation of the mobile robotic device 1.

For explanatory purpose, an example of a game play using the educational gaming system 100 is described in the following paragraphs.

In the game play, two players are playing a board game using the educational gaming system 100. Each of the players is assigned with a mobile robotic device 1, and is provided with two storage cards 7 and a set of control cards 3 (or customized cards 4). The players arrange a road by using the road pieces 2 in a free way, and then place multiple obstacles, the resource cards 5, and the mobile robotic devices 1 respectively assigned to the players on the road. For example, referring to FIG. 6, twelve road pieces 2 are connected to form the road and then one of the mobile robotic devices 1 is placed on the road, leaving other three road pieces 2 not connected to the road.

Each one of the players chooses one of the mission cards 6. The specific mission description provided by one of the mission cards 6, for example, may be "Build a station: 10 units of iron ore and 2 units of wood are required". To complete the mission indicated by the mission description, each of the players has to determine an order of playing the control cards 3 (or the customized cards 4) on his/her hand, and after deciding which of the players goes first, the player thus decided plays one of the control cards 3 (or the customized cards 4) so as to control the mobile robotic device 1 assigned to the player in his/her turn. More specifically, in one turn of one of the players, the player needs to utilize the electronic device 9 to capture the control-card graphic of the control card 3 (or the customized-card graphic of the customized card 4) via the image capturing module 92, to conduct the machine learning algorithm based on the image of the control-card graphic (or the customized-card graphic) for obtaining the control-card instruction (or the customized-card instruction), and to transmit the control-card instruction (or the customized-card instruction) to the mobile robotic device 1 for controlling the mobile robotic device 1. According to the mission indicated by the mission description, each of the mobile robotic devices 1 is repeatedly controlled to move to a location(s) on the road where one(s) of the resource cards 5 are placed. For one of the resource cards 5, an arrival of one of the mobile robotic devices 1 at the location where the resource card 5 is placed is regarded as an acquisition of the specific amount of the kind of resources represented by the resource card 5. Finally, one of the players who first completes the mission, i.e., one who first acquires the required amount(s) of resources indicated in the mission description, wins the game.

To sum up, the educational gaming system 100 according to the disclosure utilizes the electronic device 9 to conduct the machine learning algorithm based on the image of the control-card graphic for obtaining the control-card instruction, and to transmit the control-card instruction to the mobile robotic device 1. In addition, the mobile robotic device 1 obtains the road-piece signal values by scanning one of the road pieces 2, and per forms movement based on the control-card instruction and the road-piece signal values. In this way, the interactive gaming process involving the players using the educational gaming system 100 may be enhanced.

Moreover, the educational gaming system 100 provides a user with a variety of opportunities to involve in assembling the educational gaming system 100. For example, the customized card 4 allows the user to participate in designing his/her own card, including the graphic thereon and the instruction corresponding thereto. The road on which the mobile robotic device 1 moves can be built up by the user in a free way, i.e., the user is able to define the shape and the range of the road by arranging the road pieces 2 based on his/her own idea. Therefore, interactivity, variety and amusement of using the educational gaming system 100 may be strengthened.

In one embodiment, the mobile robotic device 1 is designed to be assembled by the user. Besides enjoying assembling the mobile robotic device 1, the user is able to learn the mechanical structure of the mobile robotic device 1 at the same time.

Since scanning the road pieces 2 is realized by using the infrared sensors 121 and 122 instead of other high-end image sensors, production costs of the educational gaming system 100 may be reduced. Additionally, the road pieces 2 can be printed by a general printing device (e.g., a laser printer or an inkjet printer at home), and thus, production costs of the educational gaming system 100 may be further reduced, and expansion of the road of the educational gaming system 100 may be made at a low cost.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An educational gaming system, adapted to be used with an electronic device, the electronic device including an image capturing module, said educational gaming system comprising:
    a plurality of control cards each of which has a control-card graphic corresponding to a control-card instruction;
    a plurality of road pieces which are to be arranged to form a road, and each of which is shaped as a square and has a piece background and a foreground pattern, where said piece background is colored with one color selected from among a light color and a dark color, and said foreground pattern is colored with the other one color among the light color and the dark color; and
    a mobile robotic device configured to move on the road formed by said road pieces, and including a communication unit, a driving unit, a sensing unit, and a processing unit that is electrically connected to said communication unit, said driving unit and said sensing unit;
    wherein said communication unit of said mobile robotic device is communicable with the electronic device that executes an application program (APP) customized for said educational gaming system, an image of said control-card graphic of one of said control cards to be captured by the image capturing module to enable the electronic device to
        conduct, by utilizing a supervised learning model contained in the APP with the image of said control-card graphic serving as input, a machine learning algorithm so as to obtain the control-card instruction corresponding to said control-card graphic, and
        transmit the control-card instruction thus obtained to said communication unit of said mobile robotic device;
    wherein said processing unit of said mobile robotic device is configured to obtain at least one road-piece signal value that is generated by said sensing unit by scanning one of said road pieces, and to control, based on the control-card instruction and the at least one road-piece signal value, said driving unit to drive a movement of said mobile robotic device; and
    wherein for each of said road pieces,
        said piece background is colored with the light color, said foreground pattern is colored with the dark color, said foreground pattern including four stripes that resemble rails and that are respectively parallel to four sides of said road piece, and further including four square blocks that are respectively located at four inner corners defined by intersections of said four stripes, and
        said sensing unit of said mobile robotic device includes two infrared sensors that are configured to respectively align with two of said four square blocks when said mobile robotic device is disposed on said road piece.

2. The educational gaming system as claimed in claim 1, adapted to be further used with a computer that is communicable with the electronic device, the computer including an image capturing instrument, said educational gaming system further comprising:
    a plurality of customized cards each of which has a customized-card graphic corresponding to a customized-card instruction;
    wherein images of said customized-card graphics of said customized cards are to be captured by the image capturing instrument and the customized-card instructions respectively corresponding to said customized-card graphics are to be inputted to the computer to enable the computer to
        train a copy of the supervised learning model based on the images of said customized-card graphics and the customized-card instructions, and
        update, with the copy of the supervised learning model thus trained, the supervised learning model contained in the APP executed by the electronic device;
    wherein the image of said customized-card graphic of one of said customized cards is to be captured by the image capturing module to enable the electronic device to
        conduct, by utilizing the supervised learning model thus updated with the image of said customized-card graphic serving as input, the machine learning algorithm so as to obtain the customized-card instruction corresponding to said customized-card graphic, and
        transmit the customized-card instruction thus obtained to said communication unit of said mobile robotic device; and
    wherein said processing unit of said mobile robotic device is further configured to control, based on the customized-card instruction and the at least one road-piece signal value, said driving unit to drive the movement of said mobile robotic device.

3. The educational gaming system as claimed in claim 2, wherein:
    when the computer trains the copy of the supervised learning model, at least one of parameters of the copy of the supervised learning model is adjustable based on user input.

4. The educational gaming system as claimed in claim 3, wherein:
    each of said control cards further has a control-card background pattern, said control-card background patterns respectively of said control cards being different from one another; and
    each of said customized cards further has a customized-card background pattern, said customized-card background patterns respectively of said customized cards being different from one another.

5. The educational gaming system as claimed in claim 1, wherein:
    two road pieces selected from among said road pieces are adjoined to define a calibration piece;
    said mobile robotic device moving on one of said road pieces defining said calibration piece is configured to,
        obtain two sets of road-piece signal values respectively generated by said two infrared sensors by scanning said foreground pattern, determine two minimum values that are respectively among the two sets of road-piece signal values and that serve as two minimum dark-color values, obtain another two sets of road-piece signal values respectively generated by said two infrared sensors by scanning said piece background respectively via said two infrared sensors, and determine two maximum values that are respectively among the another two sets of road-piece signal values and that serve as two maximum light-color values, the two minimum dark-color values being both greater than the two maximum light-color values; and said mobile robotic device disposed on one of said road pieces defining said calibration piece is further configured to move straight from the one of said road pieces to the other one of said road pieces, determine, based on the minimum dark-color values, the maximum light-color values, and the road-piece signal values obtained from said two infrared sensors when said mobile robotic device moves, a translation duration which corresponds to a translation time span between two consecutive edge detection events, in each of which a transition from the light color to the dark color is detected via said two infrared sensors, and store information of the translation duration.

6. The educational gaming system as claimed in claim 5, wherein:

said mobile robotic device disposed on one of said road pieces defining said calibration piece is further configured to, rotate by a quarter turn, determine, based on the minimum dark-color values, the maximum light-color values, and the road-piece signal values obtained from said two infrared sensors when said mobile robotic device rotates, a rotation duration which corresponds to a rotation time span between two consecutive block detection events, in each of which a pair of said square blocks are detected via said two infrared sensors, and store information of the rotation duration.

7. The educational gaming system as claimed in claim 6, wherein:

said processing unit of said mobile robotic device is configured to, when receiving the control-card instruction that orders the mobile robotic device to move from a current one of said road pieces forming the road to a next one of said road pieces adjoining the current one of said road pieces, control said driving unit to drive said mobile robotic device so as to move from the current one of said road pieces to the next one of said road pieces, adjust, based on the road-piece signal values respectively generated by said two infrared sensors during the movement of said mobile robotic device, control of said driving unit such that said mobile robotic device moves in a straight line, and stop the movement of said mobile robotic device when it is determined that the translation duration since first occurrence of the edge detection event during such movement of said mobile robotic device has elapsed or that the edge detection event has occurred twice during such movement of said mobile robotic device.

8. The educational gaming system as claimed in claim 6, wherein:

said processing unit of said mobile robotic device is configured to, when receiving the control-card instruction that orders said mobile robotic device to rotate by a quarter turn in one of a clockwise direction and a counterclockwise direction, control said driving unit to drive said mobile robotic device to rotate by a quarter turn in the one of a clockwise direction and a counterclockwise direction, and stop rotation of said mobile robotic device when it is determined that the rotation duration since the beginning of such rotation of said mobile robotic device has elapsed or that the block detection event has occurred twice during such rotation of said mobile robotic device.

* * * * *